(12) United States Patent
Yon et al.

(10) Patent No.: US 7,294,836 B2
(45) Date of Patent: Nov. 13, 2007

(54) THERMAL ELECTROMAGNETIC RADIATION DETECTOR COMPRISING AN ABSORBENT MEMBRANE FIXED IN SUSPENSION

(75) Inventors: Jean-Jacques Yon, Sassenage (FR); Astrid Astier, Voreppe (FR); Michel Vilain, Saint Georges de Commiers (FR)

(73) Assignees: Commissariat A l'Energie Atomique, Paris (FR); ULIS, Veurey-Voroize (FR)

( * ) Notice: Subject to any disclaimer, the term of this patent is extended or adjusted under 35 U.S.C. 154(b) by 142 days.

(21) Appl. No.: 11/206,801

(22) Filed: Aug. 19, 2005

(65) Prior Publication Data

US 2006/0054823 A1 Mar. 16, 2006

(30) Foreign Application Priority Data

Sep. 16, 2004 (FR) .................................. 04 09846

(51) Int. Cl.
*G01J 5/20* (2006.01)
*H01L 27/14* (2006.01)
*H01L 31/00* (2006.01)

(52) U.S. Cl. .................................................. 250/338.4
(58) Field of Classification Search ............. 250/338.1, 250/338.3, 338.4
See application file for complete search history.

(56) References Cited

U.S. PATENT DOCUMENTS

| | | | | |
|---|---|---|---|---|
| 5,015,858 A | | 5/1991 | Augustine et al. | |
| 5,485,010 A | * | 1/1996 | Owen et al. ................. | 250/332 |
| 5,486,698 A | * | 1/1996 | Hanson et al. ............... | 250/332 |
| 5,831,266 A | * | 11/1998 | Jerominek et al. ........ | 250/338.4 |
| 5,912,464 A | * | 6/1999 | Vilain et al. ............. | 250/338.4 |
| 5,929,441 A | * | 7/1999 | Beratan et al. .......... | 250/338.3 |
| 5,945,673 A | * | 8/1999 | Beratan et al. .......... | 250/338.3 |
| 5,962,909 A | * | 10/1999 | Jerominek et al. .......... | 257/522 |
| 5,990,481 A | * | 11/1999 | Beratan .................... | 250/338.3 |
| 6,020,216 A | * | 2/2000 | Beratan et al. ............... | 438/54 |
| 6,034,374 A | * | 3/2000 | Kimura et al. ......... | 250/370.08 |
| 6,087,661 A | * | 7/2000 | Owen et al. ................. | 250/332 |
| 6,094,127 A | * | 7/2000 | Yong .......................... | 338/15 |
| 6,121,618 A | * | 9/2000 | Morris ....................... | 250/352 |
| 6,137,107 A | * | 10/2000 | Hanson et al. ............... | 250/332 |
| 6,144,030 A | * | 11/2000 | Ray et al. ................ | 250/338.4 |
| 6,160,257 A | * | 12/2000 | Deb ........................ | 250/338.1 |
| 6,165,587 A | * | 12/2000 | Nonaka ...................... | 428/119 |
| 6,198,098 B1 | * | 3/2001 | Laou ....................... | 250/338.1 |
| 6,198,099 B1 | * | 3/2001 | Kim ........................ | 250/338.1 |
| 6,201,243 B1 | * | 3/2001 | Jerominek ............... | 250/338.1 |

(Continued)

*Primary Examiner*—David Porta
*Assistant Examiner*—David S Baker
(74) *Attorney, Agent, or Firm*—Oliff & Berridge, PLC (57) ABSTRACT

The absorbent membrane of the detector is fixed in suspension by at least one thermally insulating support part onto a front face of a substrate comprising at least two electric connection terminals electrically connected to the membrane, for example by means of conducting layers. The support part has at least one base end and a raised zone. The base end is fixed to a top part of a conducting pillar having a base fixedly secured to one of the electric connection terminals. A substantially flat zone of a bottom face of the membrane is directly in contact with the raised zone of the support part. The support part is preferably formed by a bridge having a second base end fixed to a top part of a second pillar, the raised zone being formed by a flat middle part of the bridge.

9 Claims, 7 Drawing Sheets

U.S. PATENT DOCUMENTS

| | | | |
|---|---|---|---|
| 6,201,244 B1* | 3/2001 | Ju et al. .................. | 250/338.1 |
| RE37,146 E * | 4/2001 | Cole et al. ............... | 250/495.1 |
| 6,218,667 B1* | 4/2001 | Nonaka et al. ............ | 250/353 |
| 6,229,144 B1* | 5/2001 | Ouvrier-Buffet et al. | 250/338.4 |
| 6,262,417 B1* | 7/2001 | Ju .......................... | 250/338.1 |
| 6,297,511 B1* | 10/2001 | Syllaios et al. .......... | 250/495.1 |
| 6,392,233 B1* | 5/2002 | Channin et al. ......... | 250/338.1 |
| 6,441,374 B1* | 8/2002 | Kawano et al. .......... | 250/338.1 |
| 6,448,557 B2* | 9/2002 | Oda ........................ | 250/338.3 |
| 6,576,904 B1* | 6/2003 | Volkening ................ | 250/338.2 |
| 6,621,083 B2* | 9/2003 | Cole ....................... | 250/338.1 |
| 6,690,014 B1* | 2/2004 | Gooch et al. ............ | 250/338.4 |
| 6,717,147 B2* | 4/2004 | Oda ........................ | 250/338.1 |
| 7,105,819 B2* | 9/2006 | Ryu et al. ................ | 250/338.3 |
| 2002/0040967 A1* | 4/2002 | Oda ........................ | 250/338.1 |
| 2003/0020017 A1* | 1/2003 | Cole ....................... | 250/338.1 |
| 2003/0209668 A1* | 11/2003 | Tohyama ................. | 250/338.1 |
| 2005/0109940 A1* | 5/2005 | Carr ....................... | 250/338.4 |

* cited by examiner

THERMAL ELECTROMAGNETIC RADIATION DETECTOR COMPRISING AN ABSORBENT MEMBRANE FIXED IN SUSPENSION

BACKGROUND OF THE INVENTION

The invention relates to a thermal electromagnetic radiation detector comprising an absorbent membrane fixed in suspension by thermally insulating support means onto a front face of a substrate comprising at least two electric connection terminals electrically connected to the membrane, the support means comprising at least one support part arranged between the substrate and membrane and having at least one base end and a raised zone.

1. State of the Art

Recent technological progress in silicon microelectronics and achievement of thin films has given a new boost to the technology of thermal radiation detectors comprising an absorbent membrane fixed in suspension on a substrate by thermally insulating support means.

Microelectronics is based on collective processes performed at silicon wafer level, processes which thermal detector technologies can also benefit from in many respects. These collective techniques in fact provide the possibility of achieving matrices of detectors of large complexity, typically matrices of 320×240 detectors, and also of achieving a large number of matrices on a single silicon wafer and therefore of reducing the unit manufacturing cost of the detectors.

The document U.S. Pat. No. 6,094,127 describes a bolometer with three superposed stages, in particular a stage comprising an integrated circuit, a support stage and an absorption stage. The absorption stage and support stage are separated by pillars fixedly secured to the absorption stage. Due to the fact that the support means are arranged between the absorption stage and the stage comprising the integrated circuit, the absorption stage can occupy the whole of the surface of the bolometer, which enables the ratio of the surface of the bolometer sensitive to radiation over the total surface to be increased, thus increasing the efficiency of the bolometer. However, to connect the absorption stage electrically to the support stage, an electric interconnecting part is fitted between the support stage and the absorption stage. This electric interconnecting part is formed by an electrical conduit surrounded by an insulating material. This results in a complex manufacturing process requiring a large number of manufacturing steps and thus presenting high production costs. In particular, the presence of the electric interconnecting part in contact with the absorption stage can have a detrimental effect on the absorption quality and on the sensitivity of the detector. In addition, fabricating an absorption stage having a good flatness is made difficult by the presence of the interconnecting part.

2. Object of the Invention

The object of the invention is to remedy these drawbacks and more particularly to provide a detector having a high ratio of the surface of the bolometer sensitive to radiation over the total surface of the bolometer, while simplifying the manufacturing process thereof.

According to the invention, this object is achieved by the fact that the base end of said support part is fixed to a top part of a conducting pillar having a base fixedly secured to an electric connection terminal, a substantially flat zone of a bottom face of the membrane being directly in contact with the raised zone of the support part.

According to a first particular embodiment of the invention, the support part is formed by an arm having a second end forming the raised zone.

According to a development of the invention, the detector comprises two arms respectively fixed to first and second conducting pillars and each comprising a conducting layer designed to connect the membrane to one of the conducting pillars.

According to a second particular embodiment of the invention, the support part is formed by a bridge having a second base end fixed to a top part of a second pillar, the raised zone being formed by a middle part of the bridge.

According to a development of the invention, the second pillar is conducting and the bridge comprises two conducting layers electrically insulated from one another and designed to electrically connect the membrane respectively to the conducting pillars, the conducting pillars each having a base fixedly secured to an electric connection terminal.

According to a preferred embodiment of the invention, the detector comprises two bridges each comprising a conducting layer designed to connect the membrane to the corresponding conducting pillar.

The raised zone of the support part is preferably formed by a flat segment.

A further object of the invention is to achieve a fabrication process of a detector comprising deposition of a sacrificial layer on the substrate comprising at least two electric connection terminals, etching of the sacrificial layer so as to obtain bottom and top flat zones parallel to the substrate, the bottom flat zone covering the electric connection terminals, deposition, on the sacrificial layer, of a dielectric layer and of a conducting layer designed to form the support part, etching, in the bottom zone of the sacrificial layer and in the support part, of openings opening out respectively onto the electric connection terminals, deposition, in said openings, of a conducting layer forming the conducting pillars and etching of the conducting layer forming the conducting pillars, etching of the dielectric layer and of the conducting layer, deposition of an additional sacrificial layer on the whole assembly formed by said layers so as to form a common flat surface with the conducting layer forming the support part, deposition of the membrane on said common flat surface, removal of the sacrificial layers.

BRIEF DESCRIPTION OF THE DRAWINGS

Other advantages and features will become more clearly apparent from the following description of particular embodiments of the invention given as non-restrictive examples only and represented in the accompanying drawings, in which.

DESCRIPTION OF PARTICULAR EMBODIMENTS

Figure 1:
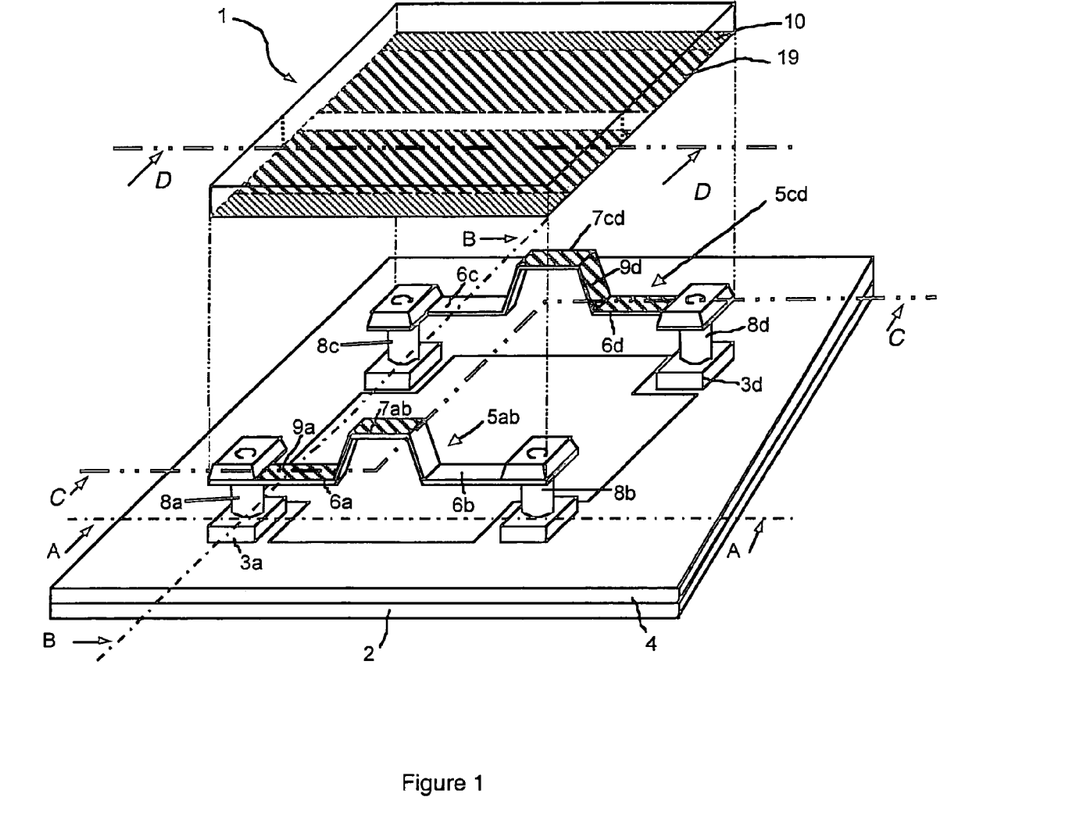
FIG. 1 represents an exploded view of a particular embodiment of a detector according to the invention.

In FIG. 1, a thermal electromagnetic radiation detector comprises an absorbent membrane 1 fixed in suspension by two thermally insulating support parts 5 onto a front face of a substrate 2. The membrane comprises for example a layer made of a material having a resistivity varying according to the temperature, for example amorphous silicon. The substrate 2 comprises two electric connection terminals 3a and 3d electrically connected to the membrane 1, as described below. The substrate 2 can comprise an integrated circuit 4 connected to the connection terminals 3, enabling the detector to be biased and the output electric signal of the detector to be processed. When related to infrared radiation, the detector extends over a square field whose side is from ten to a hundred micrometers. The substrate 2 is preferably flat and can be made of silicon.

Figure 2:
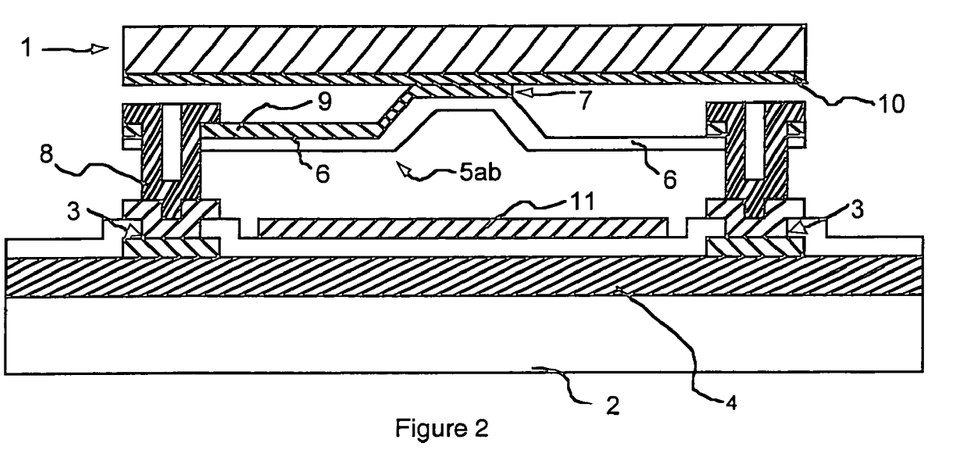
FIGS. 2 and 3 represent the detector represented in FIG. 1, respectively in cross-section along the axis A-A and along the axis B-B.

In FIG. 1, the two support ends 5, arranged between the substrate 2 and membrane 1, are each formed by a bridge (5ab and 5cd) having first and second base ends 6 (respectively 6a and 6b for the bridge 5ab and 6c and 6d for the bridge 5cd) and a raised zone 7 (respectively 7ab and 7cd) formed by a middle part of the bridge. The first end 6a of the base of the bridge 5ab is fixed to a top part of a first conducting pillar 8a having a base fixedly secured to a first electric connection terminal 3a. The second end 6b of the base of the bridge 5ab is fixed to a top part of a second pillar 8b. A substantially flat zone of a bottom face of the membrane 1 is directly in contact with the raised zone 7 of each support part 5, as illustrated in FIG. 2.

The raised zone 7 of the support part 5 is preferably formed by a flat segment, as represented in FIG. 1. A good mechanical strength is thus obtained between the membrane 1 and support part 5. Moreover, this structure enables the ratio of the surface of the detector sensitive to radiation over the total surface thereof to be maximized. The membrane 1 can in fact cover substantially the whole of the surface of the detector.

The contact surface between the membrane 1 and support part 5 can for example have a linear dimension comprised between 20% and 40% of the dimension of a side of the membrane 1.

The pillars 8 have for example a height of a few micrometers so that the support part 5 and substrate 2 are separated by a distance of a few micrometers.

In FIG. 1, the two bridges 5ab and 5cd respectively comprise conducting layers 9a and 9d (represented hatched) each designed to connect the membrane 1 to one of the conducting pillars 8. The conducting layer 9a is arranged on the raised zone 7ab of the bridge 5ab, on the base end 6a and on an inclined part connecting the zone 7ab and the end 6a. The conducting layer 9a is thus in contact with the pillar 8a. The conducting layer 9d is arranged on the raised zone 7cd of the bridge 5cd, on the base end 6d and on an inclined part connecting the zone 7cd and the end 6d. The conducting layer 9d is thus in contact with the pillar 8d. The pillars 8b and 8c and the ends 6b and 6c do not have any electrical function in the particular embodiment represented.

As the parts 5 have the function of mechanically securing and thermally insulating the membrane 1 from the substrate 2, they present a form factor that maximizes their length and minimizes their cross-section. The conducting layer 9 of a part 5 can be made of titanium nitride, enabling the electrical conduction functions to be ensured. The membrane 1 comprises two flat electric conductors 10 (FIG. 1), on its flat bottom face, covering an edge of the membrane 1 and preferably extending substantially over a whole width of the membrane 1 in order to maximize the volume of the membrane 1 through which the electric current flows. The electric conductors 10 are arranged in contact respectively with the conducting layers 9. Thus, an electric current flowing through the membrane 1 flows through the flat electric conductors 10, the conducting layers 9, the conducting pillars 8 and the electric connection terminals 3. A good electric connection of the membrane 1 is thus obtained while thermally insulating the membrane 1 sufficiently from the substrate 2. The fact that the flat conductors 10 are situated on the bottom face of the membrane 1 automatically leads to a particularly flat formation of the membrane 1, which enhances absorption of the electromagnetic radiation.

As represented in FIG. 2, the detector preferably comprises a reflecting metal layer 11 arranged on the substrate 2. This layer enables absorption of the radiation in a predetermined wavelength range to be maximized, in known manner.

Figure 3:
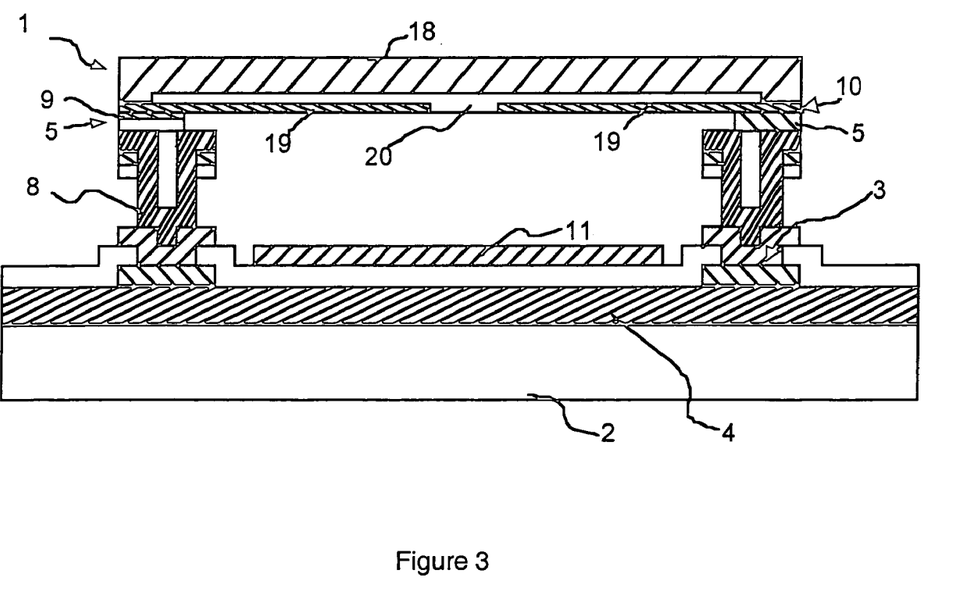

In the particular embodiment represented in FIGS. 1 to 3, the two electric conductors 10 are each associated to an additional conductor 19 (FIG. 1) arranged on the bottom face of the membrane 1 and insulated from an active layer 18 of the membrane 1 by an insulating layer 20 (FIG. 3). Each additional conductor 19 covers substantially a half of the surface of the membrane 1 with a slight gap between the additional conductors 19 so that the two additional conductors 19 are not in electrical contact. The incident electromagnetic wave produces a temperature rise of the conductors 10 and 19 due to an absorption mechanism by free electrons, particularly efficient when the sheet resistance of the conductors 10 and 19 corresponds to the vacuum impedance. The thickness and resistivity of the conductors 10 and 19 are adjusted accordingly. For example, a titanium nitride layer having a resistivity of 150 µΩ·cm and a thickness of 4 nm meets this requirement perfectly. Such a layer can constitute all of the conductors 10 and 19, as represented in FIG. 3. Thus, a marginal zone corresponding to the conductors 10 is arranged in contact with the active zone 18, and the zone complementary to the marginal zone is insulated from the active zone 18 by means of the insulating layer 20 so as to form the conductors 19.

Figure 4:
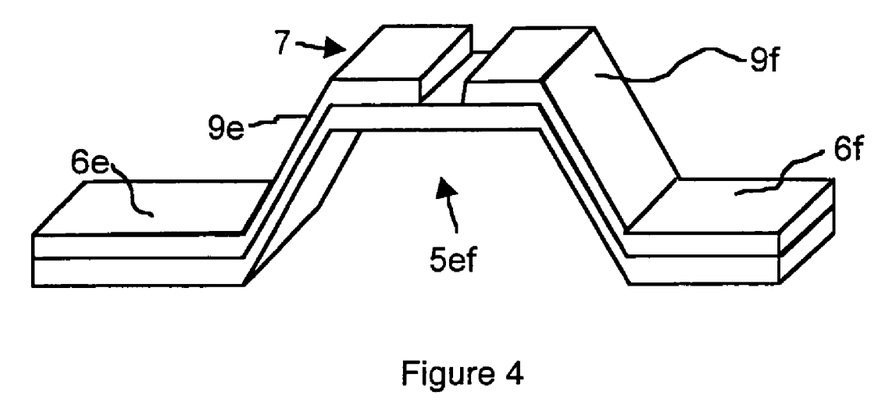
FIGS. 4 and 5 represent two particular embodiments of the support parts of a detector according to the invention.

As represented in FIG. 4, the support part 5 formed by a bridge 5ef can comprise two conducting layers 9e and 9f respectively arranged on two distinct parts of the raised zone 7, on the associated base ends 6 and on the associated inclined parts connecting the zone 7 and the end 6 (6e, 6f). The membrane 1 can thus be fixed, with its central part, onto the raised zone 7 of a single bridge. The two conducting layers 9e and 9f are separated by a gap enabling them to be electrically insulated from one another. Each of the two conducting layers 9e and 9f is designed to be in contact with an associated flat electric conductor 10 so as to electrically connect the membrane to the conducting pillars 8 whereto the bridge is fixed.

Figure 5:
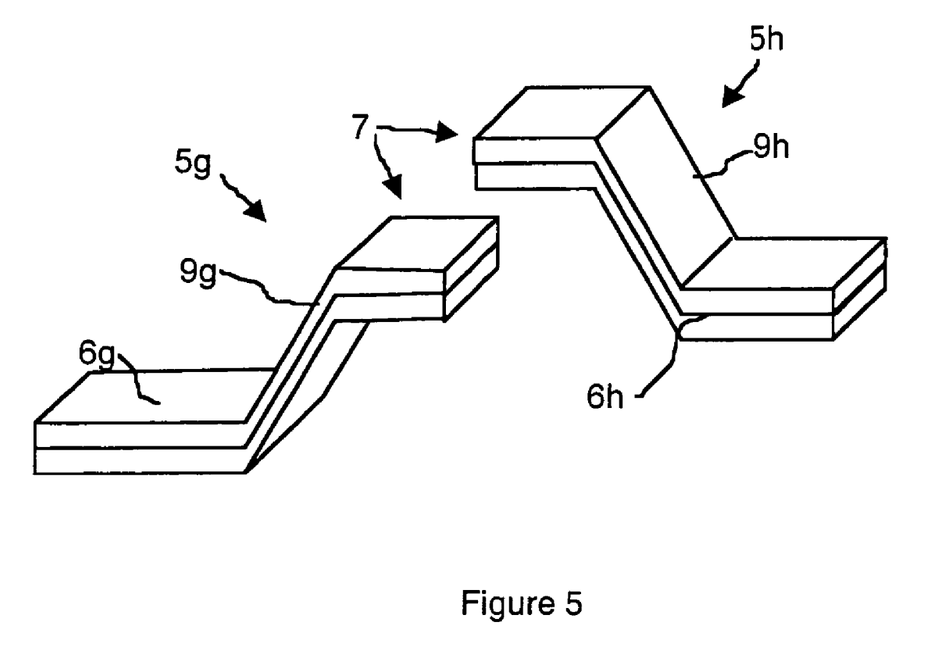

In the particular embodiment represented in FIG. 5, two support parts 5 are respectively formed by distinct first and second arms (5g and 5h) each having a base end 6 and a second end forming the raised zone 7. The base end 6g of the first arm 5g can thus be fixed to a first conducting pillar 8g and the base end 6h of the second arm 5h can thus be fixed to a second pillar 8h. A conducting layer 9g (9h) designed to connect the membrane to one of the conducting pillars 8g (8h) is arranged on each arm. Each conducting layer 9g (9h) is designed to be in contact with a corresponding electric conductor 10. The two arms thus enable two electric conductors 10 of the membrane 1 to be connected by means of conducting pillars 8 to the two terminals 3 of the substrate 2.

Figure 6:
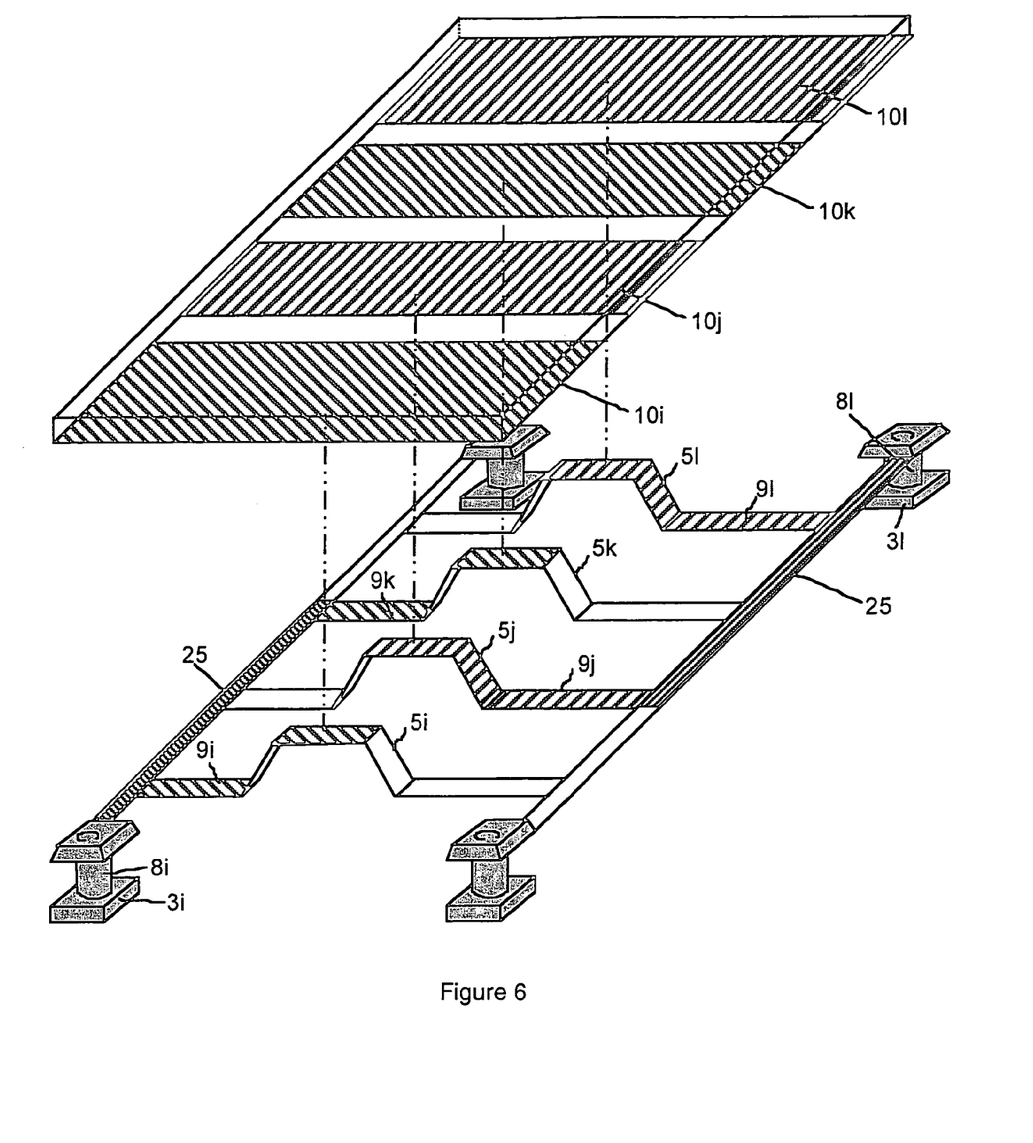
FIG. 6 illustrates an exploded view of another particular embodiment of a detector according to the invention.

In another particular embodiment represented in FIG. 6. four conductors 10 (10i, 10j, 10k, 10l) are respectively associated to four support parts 5 (5i, 5j, 5k, 5l) forming bridges. The bridges respectively comprise zones 9i, 9j, 9k, 9l of a conducting layer 9 on the one hand connected to one another alternately two by two by means of conducting segments 25 arranged between the bridges, perpendicularly to the bridges, and on the other hand respectively connected to the corresponding connection terminals 3i, 3l by means of the corresponding pillars 8i, 8l. The connection terminals 3i and 3l are connected for example respectively to the positive and negative terminals.

Figure 7:
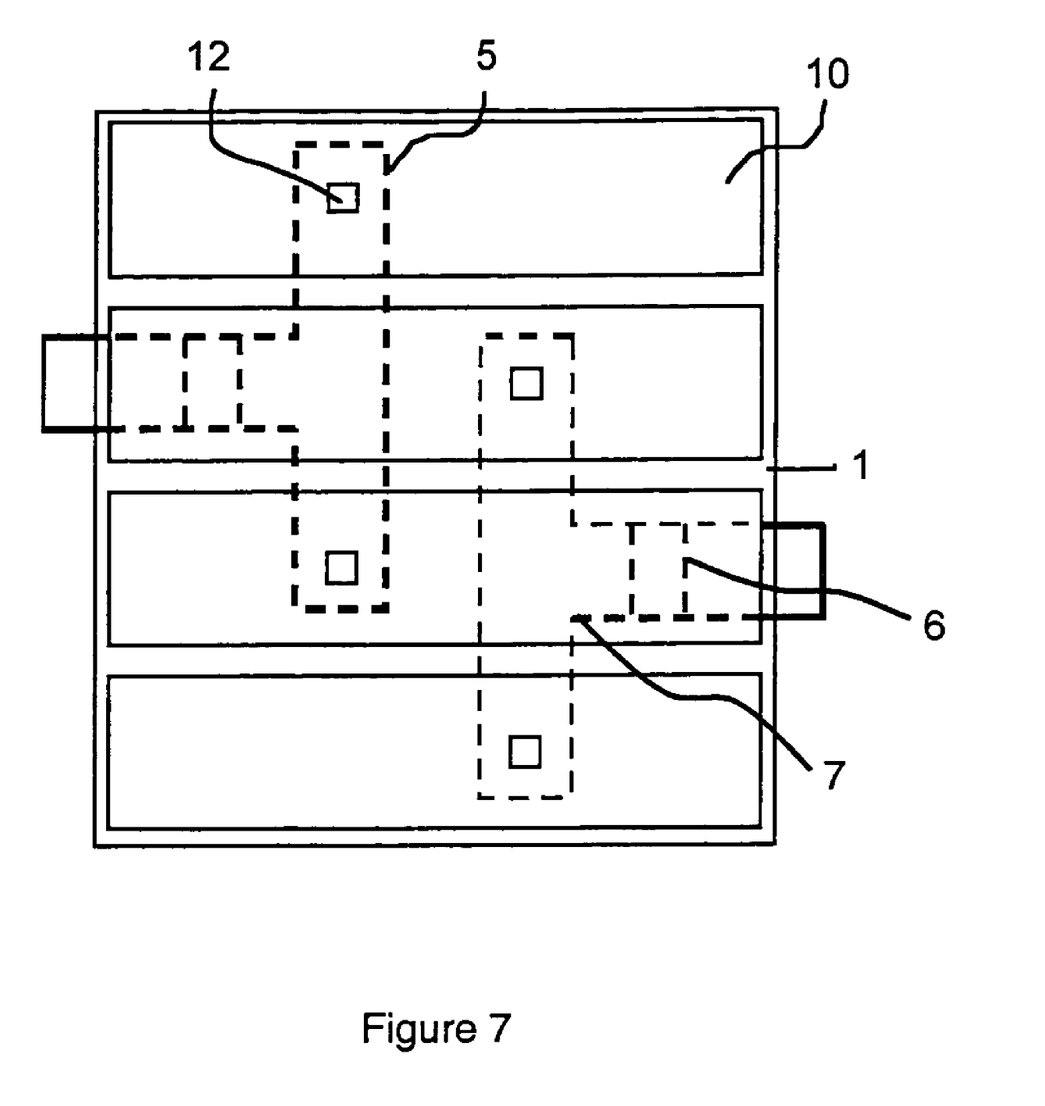
FIG. 7 illustrates a top view of a particular embodiment of a detector according to the invention.

In the particular embodiment represented in FIG. 7, four conductors 10 are associated alternately to two support parts 5, represented in broken lines. The four conductors are associated to a membrane 1 and designed to be connected in parallel. The raised zone 7 of each support part 5 extends over three conductors 10. The conductors 10 are fixed to the raised zones 7 of the support parts 5. As 10 the membrane 1 and/or support parts 5 are able to comprise a last insulating layer, the latter is eliminated at predetermined locations 12 to allow electric contact between the conducting layer 9 of a support part 5 and the associated conductor 10.

As represented in FIGS. 8 to 11, a fabrication process of a detector can comprise deposition of a sacrificial layer 13 on the substrate 2 comprising two electric connection terminals 3. The substrate can comprise a reflecting layer 11 separated from the substrate by an insulating layer 21.

Figure 8:
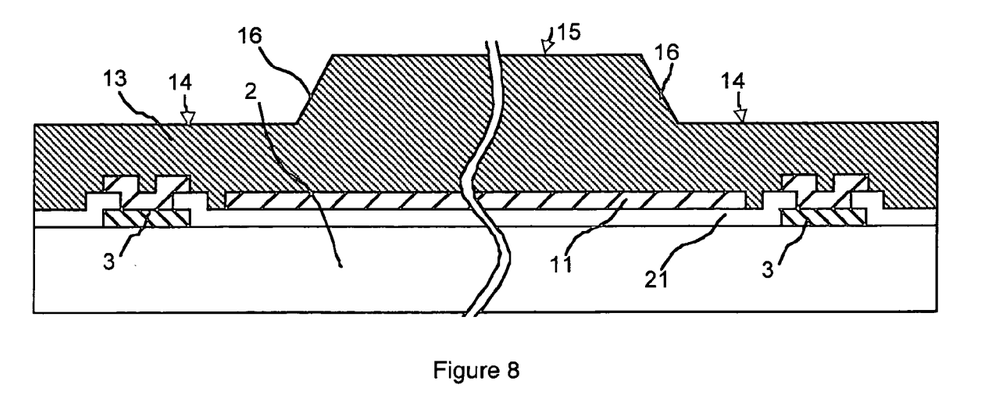
FIGS. 8 to 10 represent different steps of a particular embodiment of a fabrication process according to the invention and correspond to a cross-section along the axis C-C of FIG. 1.

The sacrificial layer 13 is etched so as to obtain a bottom flat zone 14 and a top flat zone 15 parallel to the substrate 2. The bottom flat zone 14 covers the two electric connection terminals 3 and is preferably separated from the top flat zone 15 by an inclined zone 16 having a slope comprised between 60° and 80°, which is more favourable than a sharp step for the subsequent fabrication stages. The difference of the heights of the bottom flat zone 14 and top flat zone 15 is preferably about a micron.

Figure 9:
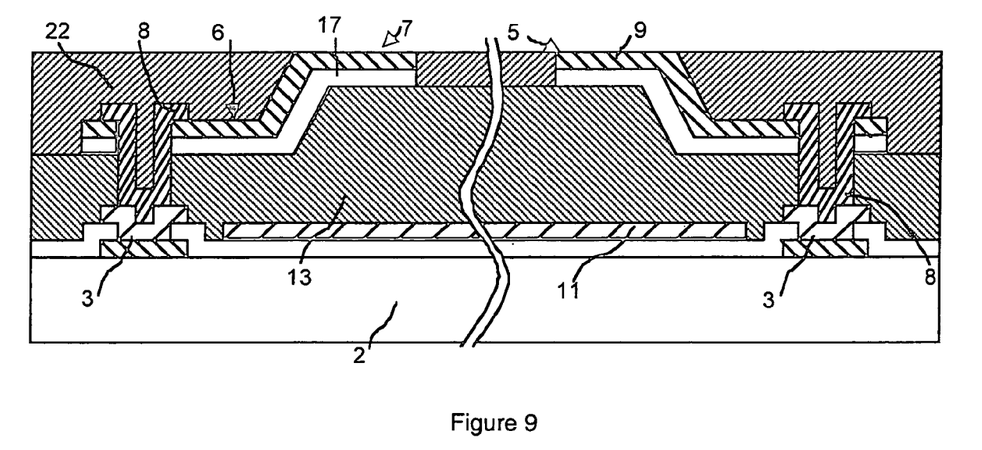

As represented in FIG. 9, a dielectric layer 17, for example of silicon oxide, and a conducting layer 9, are deposited on the sacrificial layer 13. The dielectric layer 17 and conducting layer 9 are designed to form the support part 5. The base end 6 of the support part 5 is notably formed by a part of the layers 17 and 9 arranged on the bottom flat zone 14, and the raised zone 7 of the support part 5 is notably formed by a part of the layers 17 and 9 arranged on the top flat zone 15.

An additional dielectric layer can be deposited on the conducting layer 9. The conducting layer 9 is thus deposited between two dielectric layers. The additional dielectric layer can be removed locally by etching on the raised zone 7 to enable contact between the conducting layer 9 and membrane 1.

Then two openings are etched in the bottom zone 14 of the sacrificial layer 13 and in the base end 6 of the support part 5 so as to open out respectively onto the two electric connection terminals 3 of the substrate 2. A conducting layer, for example made of tungsten silicide or titanium, is deposited in the openings so as to form the conducting pillars 8 (FIG. 9). Said conducting layer forming the conducting pillars 8 is then etched. The pillars 8 are for example cylindrical and hollow. The layers 9 and 17 are then etched laterally so as to form the support part 5. An additional sacrificial layer 22 is deposited on the whole of said layers (8, 13, 17 and 9) so as to form a common flat surface with the raised part of the conducting layer 9. The additional sacrificial layer 22 must present a suitable fluidity and thickness to obtain a sufficiently flat surface. The additional sacrificial layer 22 is preferably uniformly thinned to ensure that it is flush with the conducting layer 9.

Figure 10:
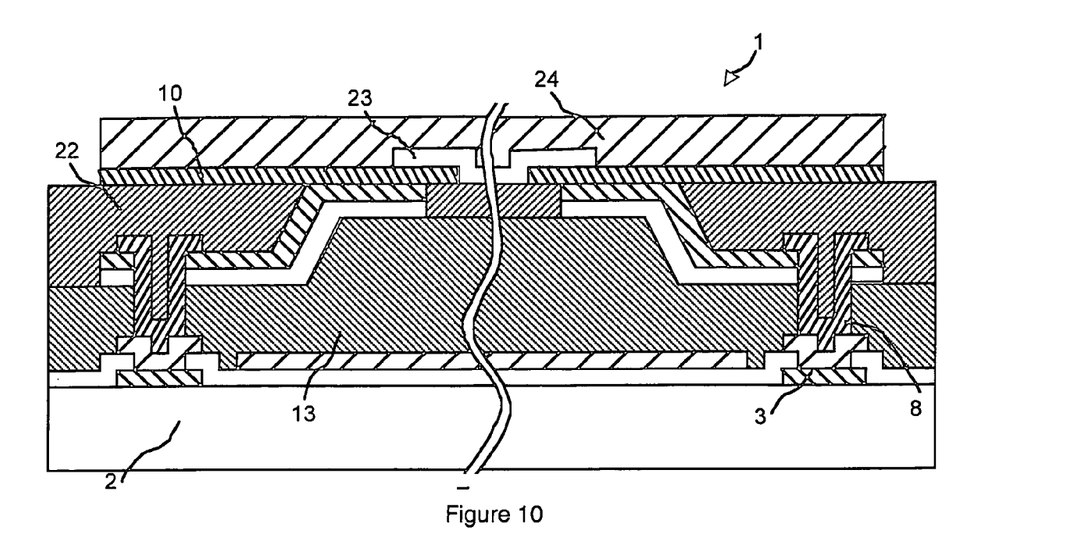
Figure 11:
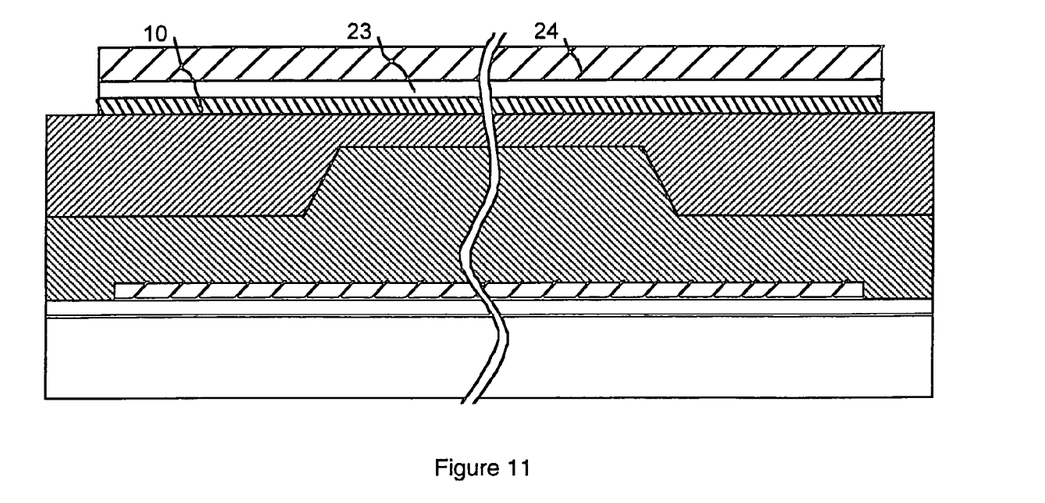
FIG. 11 illustrates the same step as that illustrated in FIG. 10, in cross-section along the axis D-D of FIG. 1.

Then the membrane 1 is deposited (FIGS. 10 and 11) on said common flat surface. As represented in FIGS. 10 and 11, the membrane 1 is preferably formed by a thin metal layer, for example of titanium nitride, forming the conductors 10, by a dielectric layer 23 and by an active layer 24 of a temperature-sensitive material. The dielectric layer 23 enables the contact zones between the conductors 10 and the active layer 24 of the membrane 1 to be bounded. At the end of the process, the sacrificial layers 13 and 22 are removed.

The invention is not limited to the embodiments represented. In particular the bridges and/or arms forming the support part(s) 5 can be of any number, electric connection of the membrane being performed for example by means of conducting layers arranged on the support part(s) 5.

The invention claimed is:

1. Thermal electromagnetic radiation detector comprising an absorbent membrane fixed in suspension by thermally insulating support means onto a front face of a substrate comprising at least two electric connection terminals electrically connected to the membrane, the support means comprising at least one support part arranged between the substrate and membrane and having at least one base end and a raised zone, detector wherein the base end of said support part is fixed to a top part of a conducting pillar having a base fixedly secured to an electric connection terminal, a substantially flat zone of a bottom face of the membrane being directly in contact with the raised zone of the support part, and the support part is formed by a bridge having a second base end fixed to a top part of a second pillar, the raised zone being formed by a middle part of the bridge.

2. The detector according to claim 1, wherein a first base end and the second base end respectively fixed to first and second conducting pillars each comprise a conducting layer designed to connect the membrane to one of the conducting pillars.

3. The detector according to claim 2, wherein the membrane comprises, on its substantially flat bottom face, at least two flat electric conductors arranged in contact respectively with the conducting layers.

4. The detector according to claim 3, wherein the conductors are situated on the edge of the membrane.

5. The detector according to claim 3, wherein the conductors extend substantially over the whole width of the membrane.

6. The detector according to claim 1, wherein the second pillar is conducting and the bridge comprises two conducting layers electrically insulated from one another and designed to electrically connect the membrane respectively to the conducting pillars, the conducting pillars each having a base fixedly secured to an electric connection terminal.

7. The detector according to claim 1, comprising two bridges each comprising a conducting layer designed to connect the membrane to the corresponding conducting pillar.

8. The detector according to claim 1, wherein the raised zone of the support part is formed by a flat segment.

9. A fabrication process of a detector according to claim 1, comprising
- deposition of a sacrificial layer on the substrate comprising at least two electric connection terminals,
- etching of the sacrificial layer so as to obtain bottom and top flat zones parallel to the substrate, the bottom flat zone covering the electric connection terminals,
- deposition, on the sacrificial layer, of a dielectric layer and of a conducting layer designed to form the support part,
- etching, in the bottom zone of the sacrificial layer and in the support part, of openings opening out respectively onto the electric connection terminals,
- deposition, in said openings, of a conducting layer forming the conducting pillars and etching of the conducting layer forming the conducting pillars,
- etching of the dielectric layer and of the conducting layer,
- deposition of an additional sacrificial layer on the whole assembly formed by said layers so as to form a common flat surface with the conducting layer forming the support part,
- deposition of the membrane on said common flat surface,
- removal of the sacrificial layers.

* * * * *